2,930,705

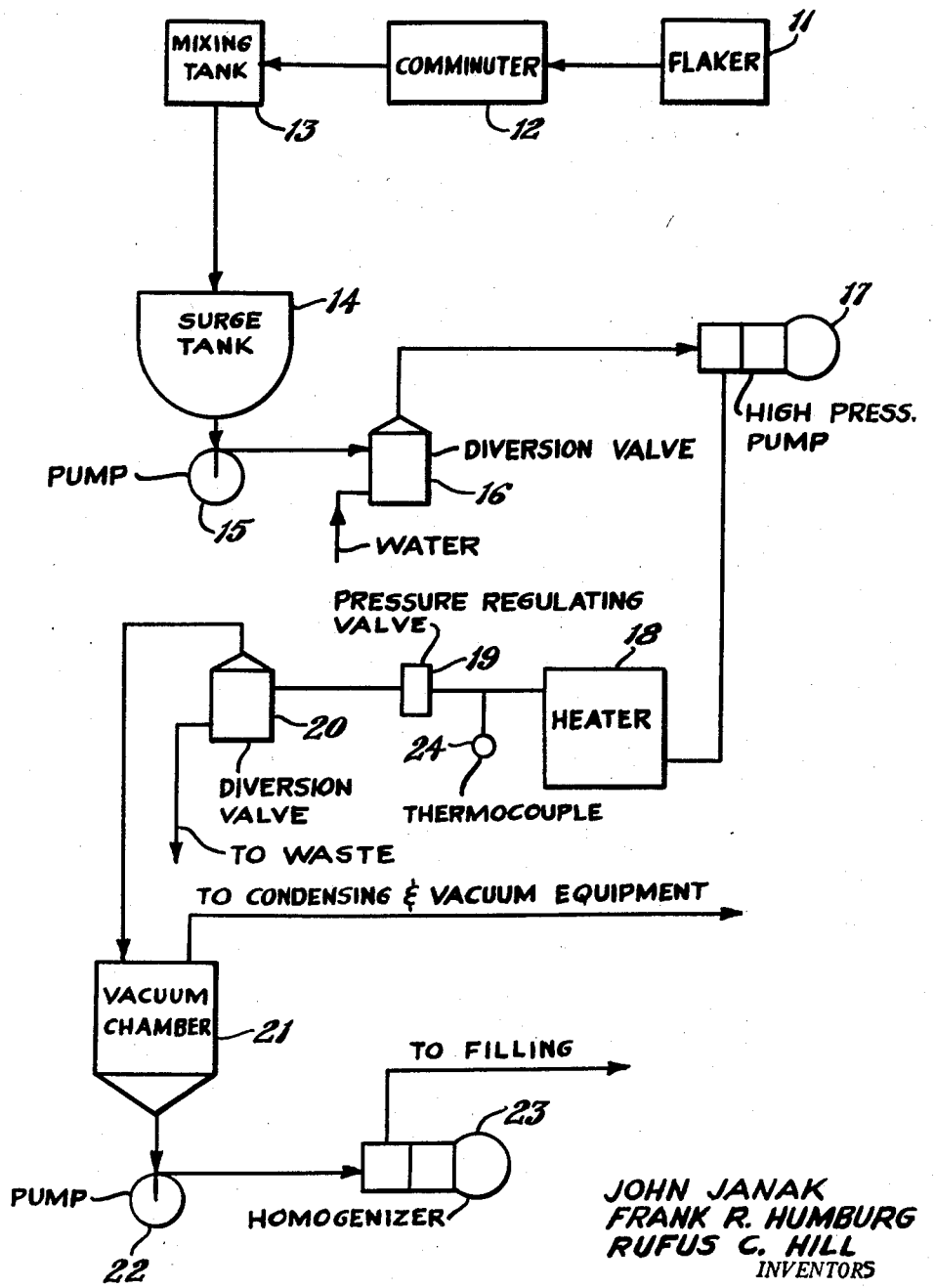

PROCESSING EGG YOLKS

John Janak, Clarendon Hills, Frank R. Humburg, Hinsdale, and Rufus C. Hill, Park Forest, Ill., assignors to Swift & Company, Chicago, Ill., a corporation of Illinois Application March 20, 1957, Serial No. 647,390

1 Claim. (Cl. 99—182)

The present invention relates to the processing of egg yolk and provides an improved method for preparing a commercially sterile, shelf-stable, precooked, canned egg yolk product having a smooth, uniform texture and consistency.

The canned egg yolk product produced by the method of this invention is composed of egg yolk, salt and water, with or without other flavoring materials such as meats, fruits, cereals, and milk. Salt (NaCl) is added to give an amount of approximately 0.8% in the finished product for flavoring purposes only. A desirable use of this product is for the feeding of infants. An advantage of the product in relation to that use is that it is of lesser viscosity than products that have been produced heretofore. A further advantage of the product is that it may be reheated in the can and fed to the infant or it may be admixed with the infant's formula or other foods. Another desirable use is for "in-flight" feeding of military pilots. Such feeding, especially of jet pilots, requires highly concentrated and nutritious foods, preferably in liquid form, which may be consumed without elaborate preparation. An advantage of egg yolk material which is processed in accordance with this invention is that it retains its liquid characteristics whereby the material may be withdrawn through a straw or tube directly from its container.

We are aware of other prior art methods for processing egg yolk. But such methods are deficient in their ability to produce a uniformly low viscosity product which may be fed to an infant by either a nursing bottle or a spoon, or for "in-flight" feeding. The instant process is, therefore, an improvement over the known processing procedures. Thus, an object of our invention is to provide an improved process for preparing a canned egg product having improved and desirable physical characteristics.

The method of our invention moves a mixture of egg yolks and water through an indirect heating zone in which the mixture is heated to temperatures, which the prior art considered to be unreasonably high, to substantially coagulate the egg yolk proteins. The heated product is not held at treatment temperatures; but, is cooled immediately to a temperature, generally below approximately 130° F., which will produce a product having a permanently smooth non-lumpy consistency and texture. We prefer that the product be cooled to within the range of 80° to 100° F. for we have found that this range produces the most satisfactory product. The cooled product is then canned by either well known aseptic techniques or conventional methods in which the cans are retorted to yield commercially sterile shelf-stable products.

The accompanying drawing is a flow diagram which will be referred to in describing the steps of our process of preparing a canned egg yolk product.

Frozen egg yolks are put through a conventional flaker 11 which discharges the flaked yolks into a conventional comminuting machine 12; the comminuted yolks are transferred to a mixing vat 13. In vat 13, water and a small amount of salt is admixed with the comminuted egg yolks. The contents of the vat are mixed by appropriate agitating paddles which are preferably completely submerged to reduce air entrapment during mixing. In an alternative, thawed or fresh egg yolks may be comminuted directly in the comminutor 12, in which case there would be no need for the frozen product flaker 11.

From the mixing vat 13 the egg yolk-water mixture is transferred to a holding vat 14 which acts as a constant supply source for the continuous operation of our preferred processing system. A pump 15 transfers the product from vat 14 to a high pressure pump 17 through flow diversion valve 16. Pump 15 furnishes a constant feed to the high pressure pump 17. The high pressure pump 17 discharges the product into an indirect heat exchange 18, which is composed of coiled stainless steel tubing of relatively small diameter and steam jacketed. From the heat exchanger 18 the product flows through a pressure regulating valve 19 and thence through a flow diversion valve 20 into a vacuum chamber 21 where the heated product is deaerated and rapidly reduced in temperature to below 130° F. by flash evaporation. The cooled product is then pumped from the vacuum chamber 21 by pump 22 to a homogenizing unit 23 and thence to a container filling and closing machine (not shown).

Operating conditions within the heat treating section of the system should be established before the egg yolk-water mixture is placed on stream. This is accomplished by admitting water to the system through the flow diversion valve 16 which is integrally connected with flow diversion valve 20 by control means (not shown). The water is pumped by pump 17 through the heater 18 pressure regulating valve 19 and discharged through flow diversion valve 20 to waste. When the desired operating temperatures are obtained, diversion valve 16 is repositioned, cutting off the water supply and admitting the egg yolk product from pump 15 into the system. The water continues to divert to waste through valve 20, and after a predetermined time, the flow diversion valve 20 is closed, diverting the egg product to the cooling chamber 21.

A thermocouple 24 is connected to diversion valve 20 and is positioned to sense the temperature of product flowing from heater 18. Should the product temperature from heater 18 fall below the desired treatment temperature, as indicated by the temperature sensing element 24, the flow diversion valve 20 will automatically divert the sub-temperature product to waste. If the situation cannot be corrected immediately, valve 16 is changed to admit water to the system until the operating temperatures are abain obtained, after which time the product flow will be reinitiated, thereby allowing the continuous processing of our egg yolk product.

The discharge line from the indirect heat exchanger 18 to the vacuum chamber 21 should be as short as possible so that substantially no holding of the heated product occurs. Valve 19 is placed in this line to step down the pressures to sub-atmospheric and avoid cooling of the hot product up to the time it leaves the heater.

In one preferred installation, an egg-water-salt mixture, containing approximately 24.5% total solids, was pumped by the high pressure pump 17 through a heating coil 18 (229 feet long with an internal diameter of 0.334 inch and an outside diameter of 0.5 inch) at a flow rate of approximately 40 pounds per minute, and the product was heated to a temperature of 310° F. The heated product was not held at the treatment temperature but immediately discharged into the evaporation chamber 21 where it was rapidly cooled to a temperature of 87° F. by flash evaporation and removal of a portion of the water of the initial egg yolk-water mixture. The cooled mixture was canned in glass jars and retorted at a temperature of 235° F. for 75 minutes. The finished product had a total solids content of 29.9%. Proper sterilization of the canned product may be obtained by the use of various times and temperatures sufficient to commercially sterilize the product. We prefer to use 235° F. for 75 minutes which will satisfactorily sterilize the product.

Alternatively, the product may be aseptically filled and sealed in presterilized cans. All of the aseptic canning equipment used in our process, including the filling and sealing machine, is old and well known to the art. In employing this alternative method of canning, precaution must be taken to presterilize the system by known techniques. Presterilization of the system may be effected by passing water through the heat exchanger to processing temperatures and the hot water through the flow diversion valve 20 to the discharging chamber 21 (vacuum omitted) where it is removed by pump 22 to the aseptic canning unit which is independently sterilized by conventional means. When the product is aseptically canned, the homogenizing and retorting operations are omitted.

In the following examples illustrating the methods of practicing this invention it will be understood that the flow rates and times may be varied for heating the product to effect substantial coagulation of the egg yolk proteins without developing abnormally high consistencies.

Example I

Frozen egg yolk was flaked, comminuted and admixed with salt and water. The mixture, containing 25.75% total solids, was pumped through the above described indirect heat exchanger at a flow rate of 40 pounds per minute and heated to a temperature of 310° F. The heated mixture, without holding, was immediately cooled by flash evaporation to 90° F. and canned. The product was thereafter retorted at 235° F. for 75 minutes. It had a total solids content of 30%, was smooth in texture, and had a consistency of 5,000 centipoises.

Example II

A mixture of egg yolks, salt and water, containing 25.75% total solids, was treated under the same conditions as in Example I, except (a) the flow rates through the system were varied from 10 pounds to 160 pounds per minute, and (b) each lot was split so that one-half was homogenized and the other not homogenized prior to canning. The results were:

| Lot No. | Flow Rate, Pounds Per Minute | Heating Time In Seconds[1] | Total Solids In Finished Product | Consistency in Centipoises | |
|---|---|---|---|---|---|
| | | | | Not Homogenized | Homogenized |
| 1 | 10 | 53.2 | 29.9 | 7,700 | 7,500 |
| 2 | 20 | 26.6 | 30.0 | 8,500 | 8,000 |
| 3 | 40 | 13.3 | 30.1 | 5,500 | 5,000 |
| 4 | 80 | 6.6 | 29.8 | 3,500 | 4,200 |
| 5 | 160 | 3.3 | 29.9 | 4,700 | 4,500 |

[1] The time to bring the product up to desired treatment temperature.

The results indicate that no significant difference exists in total solids content or consistency of the finished product when varying flow rates are used. Further, the heating time for obtaining the desired temperature may be varied from approximately 3 seconds to 54 seconds without substantially varying the final consistency. Homogenization of the product prior to canning imparted a slightly smoother texture to the resultant product. If desired, the mixture may be homogenized, but it is not a necessary element of the invention.

Example III

A mixture containing 4.15% total solids at a flow rate of 40 pounds per minute was heated to 360° F., immediately cooled to 70° F., canned and retorted at 235° F. for 75 minutes. The resultant product had a total solids content of 5%, was slightly grainy and sandy in texture, and had a slightly cooked flavor. Its consistency was 750 centipoises.

Example IV

A mixture of 42.9% total solids, at a flow rate of 80 pounds per minute, was heated to 350° F., flash cooled to 70° F., homogenized, canned and retorted. The product contained 50.1% total solids, was smooth and creamy in texture, and had a consistency of 15,000 centipoises.

Example V

A mixture containing 26.3% total solids was pumped through the indirect heat exchanger at a flow rate of 40 pounds per minute, heated to 310° F. and immediately cooled by flash evaporation to a temperature of 130° F. The cooled product was split into two lots. Lot A was aseptically canned and lot B was canned in the conventional manner and retorted. The product from lot A was very fluid with a consistency of 500 centipoises, while the consistency of lot B had increased to 3,500 centipoises after retorting. Both products were homogeneous, smooth in texture and shelf-stable, without any significant viscosity increase after extended storage at room temperature. This example illustrates that egg yolks which have been substantially coagulated prior to canning are susceptible to viscosity increases if subjected to subsequent heat treatment as in retorting for effecting commercial sterilization of the conventionally canned materials. It is the effective control of this subsequent viscosity increase that is lacking in prior art methods, but which is had with our process.

In the above examples, the consistency was measured by a Brookfield viscometer. Prior to taking the viscosity reading, each sample was mixed with a spatula having a ½-inch blade for 2-4 revolutions. The viscosity reading of the viscometer was obtained by using a No. 7 stirrer for 4 dial revolutions at 20 r.p.m. prior to reading.

The above examples illustrate that egg yolk-water mixtures which have been heated in the indirect heat exchanger to exit temperatures varying from about 310° F. to 350° F. with formulations containing between 5% to 50% egg yolk solids give acceptable products. Our preferred temperature range is 310–330° F. for consumer type products containing 20–35% egg yolk solids. Installations which retain the product within the heating coils for periods of time varying from 3 to 60 seconds with flow rates of 10 to 160 pounds per minute will produce satisfactory products. The residence time of the mixture within the heater in and of itself is not critical but the temperature to which the product is heated is. The heated product must not be held but must be rapidly cooled immediately after the treatment temperature is obtained, as by means of flash evaporation, to temperatures below 130° F. We believe that the essence of our invention lies in the combination of treatment of egg yolks at elevated temperatures plus immediate flash evaporation to cool the heat treated product, for we have found that it is not satisfactory to heat the product to elevated temperatures and hold for a period of time to coagulate the product.

Obviously many modifications and variations of the invention as hereinbefore set forth may be made without departing from the spirit and scope thereof, and therefore only such limitations should be imposed as are indicated in the appended claim. For example, the indirect heater 18 described might be replaced by a "Volator," which is well known in the art, although with less desirable results.

We claim:

In the processing of egg yolks to obtain a product of smooth consistency, the steps comprising: forming a mixture of egg yolk and water with egg yolk solids comprising approximately 5% to approximately 50% of said mixture; heating said mixture by indirect heat exchange to a temperature above 310° F. but below 350° F.; immediately rapidly cooling by flash evaporation the heated mixture to a temperature between about 70° F. and 130° F.; thereafter canning said mixture and retorting said canned mixture to a temperature sufficient to commercially sterilize said mixture.

References Cited in the file of this patent
UNITED STATES PATENTS 2,766,126   Hawk _____ Oct. 9, 1956

OTHER REFERENCES

"Food Engineering," August 1953, p. 143, article entitled Strained Egg Yolk Product.